US006724783B2

(12) United States Patent
Jalali et al.

(10) Patent No.: US 6,724,783 B2
(45) Date of Patent: Apr. 20, 2004

(54) METHOD AND APPARATUS FOR ARBITRARY WAVEFORM GENERATION USING PHOTONICS

(75) Inventors: Bahram Jalali, Sherman Oaks, CA (US); Parag V. Kelkar, Los Angeles, CA (US)

(73) Assignee: The Regents of the University of California, Oakland, CA (US)

(*) Notice: Subject to any disclaimer, the term of this patent is extended or adjusted under 35 U.S.C. 154(b) by 55 days.

(21) Appl. No.: 09/834,737

(22) Filed: Apr. 13, 2001

(65) Prior Publication Data

US 2002/0067747 A1 Jun. 6, 2002

Related U.S. Application Data

(60) Provisional application No. 60/197,797, filed on Apr. 14, 2000.

(51) Int. Cl.[7] .................................................. H01S 3/00
(52) U.S. Cl. .......................................... 372/9; 372/25
(58) Field of Search ........................ 372/9, 102; 385/37, 385/24, 10, 122

(56) References Cited

U.S. PATENT DOCUMENTS

| 5,315,423 A | | 5/1994 | Hong | |
|---|---|---|---|---|
| 5,997,795 A | * | 12/1999 | Danforth et al. | 264/401 |
| 6,122,419 A | * | 9/2000 | Kurokawa et al. | 385/31 |
| 6,195,484 B1 | * | 2/2001 | Brennan et al. | 385/37 |
| 6,288,659 B1 | * | 9/2001 | Jalali et al. | 341/137 |
| 6,457,178 B1 | * | 9/2002 | Slim | 725/127 |

OTHER PUBLICATIONS

Bhushan et al., "150 Gample/s wavelength division sampler with time–stretched output", Electronics Letters, vol. 34, No. 5, Mar. 5, 1998, pp. 474–475.
Coppinger et al., "12 Gsample/s wavelength division sampling analogue–to–digital converter", Electronics Letters, vol. 36, No. 4, Feb. 17, 2000, pp. 316–318.
Kelkar et al., "Time–domain optical sensing", Electronics Letters, vol. 35, No. 19, Sep. 16, 1999, pp. 1661–1662.

* cited by examiner

Primary Examiner—Paul Ip
Assistant Examiner—Dung T Nguyen
(74) Attorney, Agent, or Firm—John P. O'Banion

(57) ABSTRACT

An apparatus and method for synthesizing waveforms with arbitrary amplitude, frequency, and phase modulation. Pulses from a broadband (supercontinuum) optical source are filtered into a plurality of wavelength channels, and the intensity of each wavelength channel is adjusted to an appropriate level depending on the desired shape of the envelope of the output pulse. The envelope of the sampling wavelength channels can be stretched, compressed, or inverted in the time domain later using a dispersive medium. After time domain manipulation, the optical pulse train is observed with a combination of high-speed photodetectors and a radio frequency low-pass filter, a low-speed photodetector.

109 Claims, 8 Drawing Sheets

METHOD AND APPARATUS FOR ARBITRARY WAVEFORM GENERATION USING PHOTONICS

CROSS REFERENCE TO RELATED APPLICATIONS

This application claims priority from U.S. provisional application Ser. No. 60/197,797 filed on Apr. 14, 2000, and incorporated herein by reference.

STATEMENT REGARDING FEDERALLY SPONSORED RESEARCH OR DEVELOPMENT

This invention was made with Government support under Grant No. N66001-98-8924, awarded by the Navy. The Government has certain rights in this invention.

REFERENCE TO A MICROFICHE APPENDIX

Not Applicable

BACKGROUND OF THE INVENTION

1. Field of the Invention

This invention pertains generally to signal generation and, more particularly, to a method and apparatus for generation of an arbitrary electronic waveform using photonics.

2. Description of the Background Art

Signal and data generators are well known tools that are commonly used in a number of applications ranging from designing and testing equipment and circuits, to communication and radar systems. A particular type of data generator, referred to as an "arbitrary wavelength generator" (AWG), is particularly useful in radar and Electronic Warfare (EW) applications. In addition, it can be used for characterizing circuits and systems by simulating "real" physical conditions. In particular, the device can be used for margin testing by simulating amplitude and timing impairments such as cross talk, intersymbol effects, reflections, ground bounce, noise simulations, jitter testing, and the like. High speed AWGs, such as a Tektronix AWG 610, are available that combine waveform generation and editing that enables the user to create a waveform from scratch, automatically transfer a waveform from an oscilloscope, download signals created via computer simulation tools, and modify signals using built-in editors. Real world signal impairments such as jitter, noise, fading, or the like can be easily simulated using such an AWG.

Other types of data generators are available as well. For example, the Agilent Technologies 81200 provides a platform for verifying digital devices under real-world conditions. The device has a high-speed pattern rate, large pattern depth and a scalable configuration that facilitates digital device verification and characterization. Digital-to-analog converters (DACs) and direct digital synthesizers (DDSs) are at the heart of an electronic AWG.

The bandwidth of current technology is limited to a few GHz by the electronic DAC used in AWG systems. What is needed is a new AWG technology that can synthesize waveforms with much large bandwidths and with arbitrary Amplitude Modulation (AM), Frequency Modulation (FM) and Phase Modulation (PM). The present invention satisfies that need, as well as others, as described herein. It can also be used to generate for microwave, millimeter wave and Tera Hertz frequency signals.

BRIEF SUMMARY OF THE INVENTION

The present invention, which will be referred to herein as a photonic arbitrary waveform generator (PAWG), comprises an apparatus that can synthesize waveforms with arbitrary amplitude, frequency, and phase modulation. The invention can be used in place of digital-to-analog converters (DACs) or electronic arbitrary waveform generators (AWGs) to reproduce waveforms with arbitrary amplitude, frequency and phase variations. The invention can also be used to synthesize spectrally pure sine waves over a wide range of frequencies in place of a direct digital synthesizer (DDS).

By way of example, and not of limitation, in accordance with an aspect of the present invention, pulses from a broadband (supercontinuum) optical source are filtered into a plurality of wavelength channels. The intensity of each wavelength channel is adjusted to an appropriate level depending on the desired shape of the envelope of the output electrical waveform. In a wavelength modulation stage, the wavelength channels, which function as samples of the arbitrary output waveform, can also be time differentiated by introducing small incremental time delays between them or the envelope of the sampling wavelength channels can be further stretched, compressed, or inverted in the time domain later by choosing the proper dispersive medium. After proper time domain manipulation, the optical waveform is observed with a combination of high-speed photo-detectors and a radio frequency (RF) low-pass filter to produce an output electrical waveform.

By way of further example, and not of limitation, the present invention can have various embodiments.

In a first embodiment, gratings are used for wavelength division, a spatial light modulator (SLM) is used for intensity adjustments, and a dispersive medium is used for time domain treatment. The supercontinuum pulses are passed through the SLM, wherein the attenuation of the individual pixels can be set by adjusting the gray level of that pixel. By knowledge of the properties of the dispersive medium, wavelength dependence of the photodetector, low-pass characteristics of the photodetector, the radio frequency (RF) filter, and the non-uniformity in the intensity of the various wavelength channels, the required attenuation in each channel that would mimic the envelope of the desired waveform can be determined. The delay between the various wavelength channels is minimal, the output optical pulses are passed through the dispersive medium (e.g., a normal single mode fiber, a negative dispersion fiber, etc.) for time domain manipulation. Different spectral components are separated in time domain due to the wavelength dependent group velocity. Either positive or negative dispersion fibers can be used. The negative dispersion will result in a waveform that is the time-reversed image of the waveform produced by positive dispersion. For a given sign of dispersion, the time-reversal can also be achieved by reversing the spectrum modulation using the SLM or any other type of optical filter. The length of the fiber, the main dispersive element in the system, can be adjusted to achieve the desired time domain spread, and hence the electrical bandwidth of the waveform In a second embodiment, which is a true time delay (TTD) implementation, wavelength division, intensity adjustment of each wavelength channel, and introduction of incremental time delay between wavelength channels is achieved by passing the supercontinuum pulses through a true time delay device. In one embodiment of the true time delay, the device comprises an N input, N output arrayed waveguide grating where all the corresponding inputs and outputs except one set of input-output ports are connected through an incremental time delay. For the PAWG of the present invention, optical attenuators or electo-optic modulators are also incorporated into each delay line. The supercontinuum pulse is then fed to the free input. The corresponding output comprises a series of optical pulses at different wavelengths set by the arrayed waveguide grating and with set incremental time delay between the pulses. The attenuation for each channel is set in the delay stage to appropriate levels. The output from the true time delay device can be further stretched, compressed, or inverted, if necessary, using a second true time delay or using a fiber with appropriate length and dispersion characteristics.

The output from either embodiment is the sampled version of the desired output waveform. This waveform is observed with either a combination of a high-speed photodetector and an RF low-pass filter, or a low-speed photodetector. The bandwidth of the detecting circuit is determined by the time separation between the adjacent sampling wavelength channels, and the amount dispersion (if fiber is used) or time delay (if true time delay is used). The resultant waveform is the desired output waveform.

An object of the invention is to provide synthesize waveforms at considerably higher frequencies than related devices, into the tens of GHz range.

Another object of the invention is to provide the ability to stretch, compress, and even time-invert these waveforms using optical fibers with proper dispersion characteristics.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

For illustrative purposes the present invention is embodied in the apparatus and method generally described with reference to FIG. 1 through FIG. 9. It will be appreciated that the apparatus may vary as to configuration and as to details of the parts, and that the method may vary as to the specific steps and sequence, without departing from the basic concepts as disclosed herein.

To overcome the limitations in the related art, and to overcome other limitations that will become apparent upon reading and understanding the present specification, the present invention discloses a method and apparatus for synthesizing waveforms with arbitrary amplitude, frequency, and phase modulation. The invention can be used in place of digital-to-analog converters (DACs) or electronic arbitrary waveform generators (AWGs) to reproduce waveforms with arbitrary amplitude, frequency phase variations. The invention can also be used to synthesize spectrally pure sine waves over a wide range of frequencies in place of a Direct Digital Synthesizer (DDS).

Figure 1:
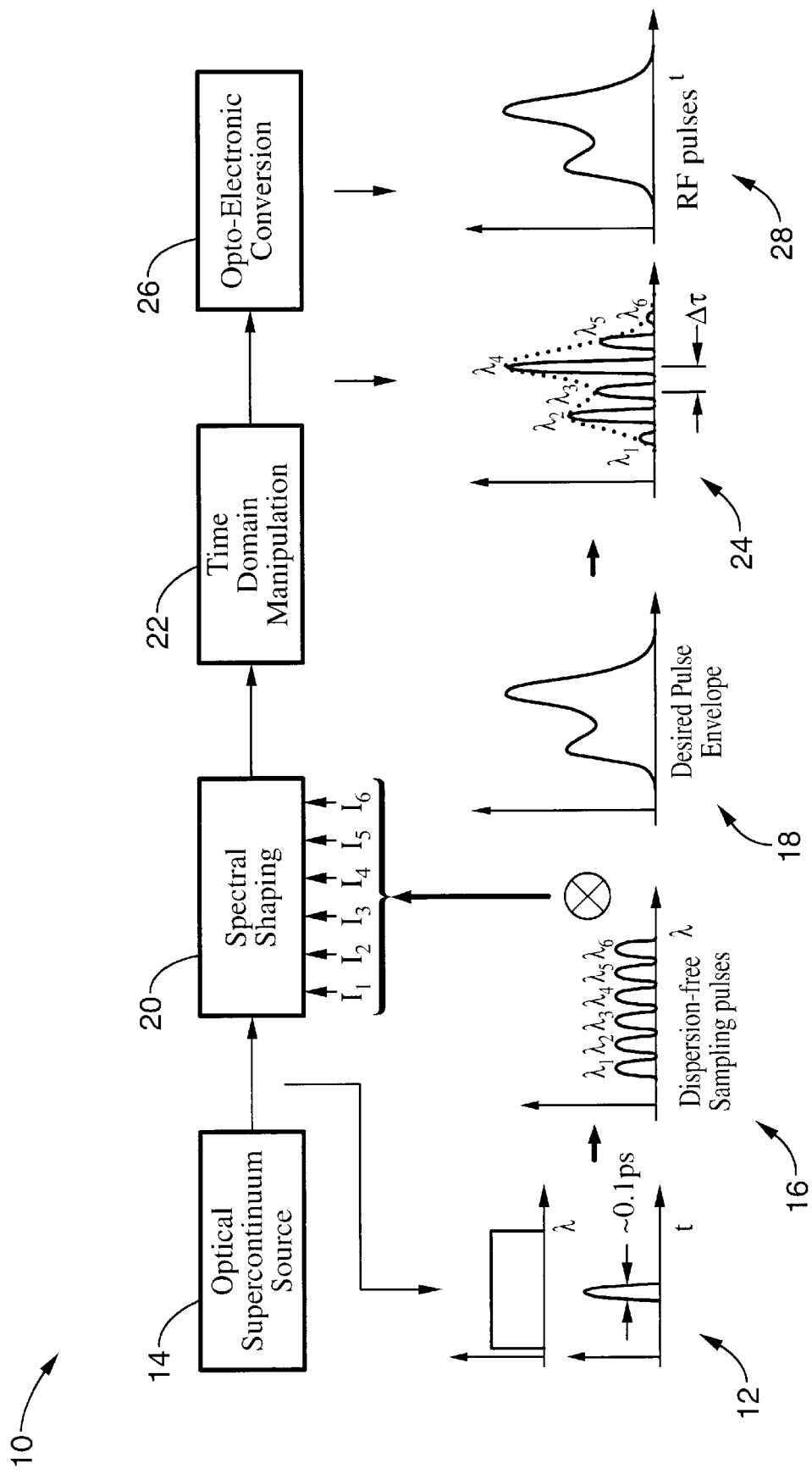
FIG. 1 is a schematic diagram of an embodiment of a photonic arbitrary waveform generator according to the present invention.

A schematic diagram of an embodiment of a photonic arbitrary waveform generator (PAWG) 10 according to the present invention is shown in FIG. 1 along with graphs showing the inputs or outputs of the functional blocks. In the embodiment of FIG. 1, pulses 12 are generated from a broadband (i.e., supercontinuum) optical source 14 and filtered into a plurality of wavelength channels 16 which function as free sampling pulses for the output waveform. In FIG. 1, six wavelength channels $\lambda_1$ through $\lambda_6$ are shown with corresponding intensities $I_1$ through $I_6$. The intensity of each wavelength channel 16 is adjusted to an appropriate level depending on the desired shape of the envelope 18 of the output electrical waveform, and the wavelength channels undergo spectral shaping in a spectral shaping device 20. The spectral waveform is then converted into a waveform in time by a time domain manipulation device 22, which can be a dispersion device or a true time delay device. After the desired time domain manipulation, the output optical waveform 24 is observed with an electro-optic converter device 26, such as a high-speed photodetector and an RF low-pass filter, or a low-speed photodetector, to generate the output electrical waveform 28.

Broadband optical source 14 preferably comprises a mode-locked erbium-doped fiber laser, or a gain switched semiconductor laser, or an externally modulated laser transmitter that is modulated by a Mach-Zehnder type interferometer or an electro-absorption type device, or a pair of continuous-wave lasers having heterodyned outputs, or the like, followed by an optical amplifier and a non-linear compression stage. Other supercontinuum optical sources can be used as well. The supercontinuum fiber in optical source 14 can be a single mode fiber, a series of dispersion shifted fibers each with different values of zero dispersion wavelengths, a dispersion decreasing fiber, a tapered fiber, or the like. The key requirement for optical source 14 is that the peak power of optical pulses before the nonlinear compression stage must be large enough to cause non linearities in the nonlinear stage.

Figure 2:
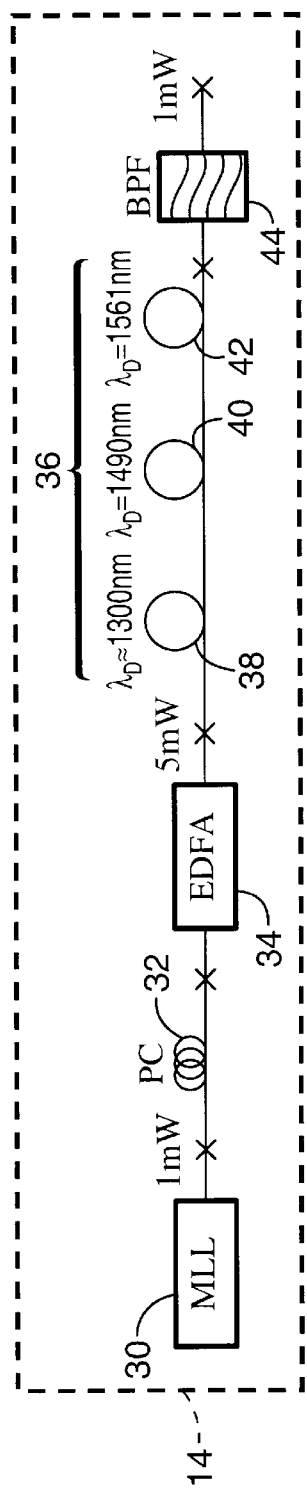
FIG. 2 is a schematic diagram of an embodiment of a supercontinuum broadband optical source employed in the photonic arbitrary waveform generator of FIG. 1.
Figure 3:
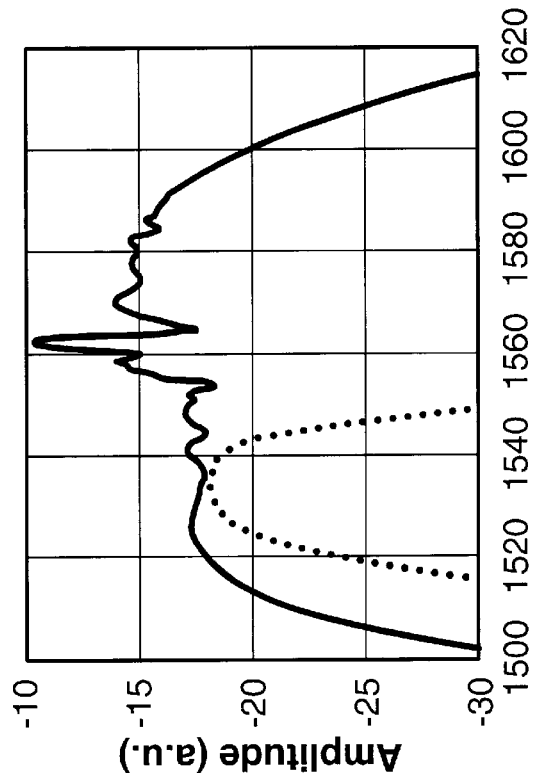
FIG. 3 is a graph showing the bandpass filtered and unfiltered output characteristics of the optical source of FIG. 2.
Figure 4:
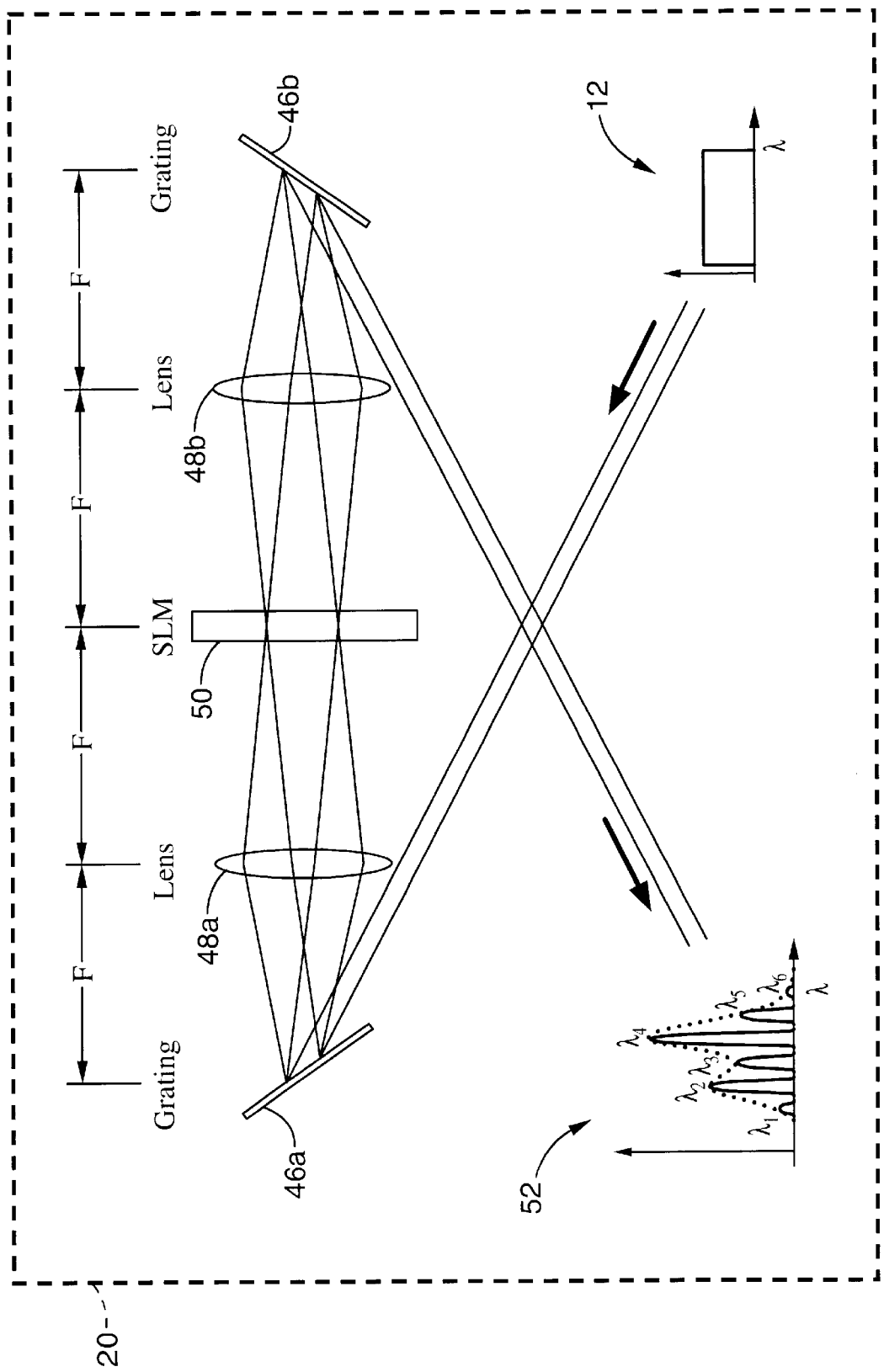
FIG. 4 is schematic diagram of an embodiment of a spectral shaping device employed in the photonic arbitrary waveform generator of FIG. 1 which uses a spatial light modulator.

For example, referring to FIG. 2, a passively mode locked fiber laser (MLL) 30 with a repetition rate of approximately 20 MHz and an average power output of approximately 1 mW could be used. The output of laser 30 is passed through a polarization controller (PC) 32 before being amplified to approximately 5 mW with an erbium-doped fiber amplifier (EDFA) 34. The amplified signal is then passed through a supercontinuum module 36 that comprises three stages 38, 40, 42. The length of the first single mode fiber (SMF) stage 38 ($\lambda_D \approx 1300$ nm) is required to be half the length of the soliton period to achieve maximum pulse compression and spectral broadening. The calculated length of the SMF is used initially for the first stage 38. Adjustments to the length are done to optimize the spectrum. Once the length of the first stage 38 is fixed, a similar procedure is followed for the second stage 40, which has dispersion shifted fiber with $\lambda_D = 1490$ nm. The length of the third stage 42 ($\lambda_D = 1561$ nm) is fixed to obtained maximum spectral width. The output is then passed through a bandpass filter 44. This method of generating a broadband optical pulse (i.e., a supercontinuum) is well documented in, for example, Kim, J. et al., "Low energy, enhanced supercontinuum generation in high nonlinearity dispersion-shifted fibers", Technical Digest, CLEO '99, Opt. Soc. America, 1999. p.224–225, incorporated herein by reference. The supercontinuum spectrum before the bandpass filter 44 is shown in FIG. 3 with a solid line. The filtered portion of the supercontinuum spectrum is shown in FIG. 3 with a dotted line. Note that the filtered spectrum is centered at approximately 1533 nm and has a 1 dB bandwidth of approximately 17 nm. Note also that there is approximately 1 mW of average power in this portion of the supercontinuum. Supercontinuum sources with a bandwidth of up to approximately 325 nm are currently available. The design of the PAWG of the present invention depends on the spectral width of the supercontinuum source; however, system performance is not limited by the bandwidth of the source. Other parameters such as the number of sampling channels that can be used and the separation between the channels, however, does depend on the available optical bandwidth from the optical source.

Spectral shaping device 20 and time domain manipulation device 22 can be embodied in various ways as well. For example, referring to FIG. 1 and FIG. 4, a first embodiment employs diffraction gratings 46a, 46b for wavelength separation, lenses 48a, 48b for focusing, and a spatial light modulator (SLM) 50 for intensity adjustments, wherein such elements are spaced apart at focal length F. The supercontinuum pulses are passed through the SLM 50 with a confocal arrangement as shown. The output optical pulses 52 are passed a dispersive medium if needed for time domain manipulation to produce the final optical waveform 24. A normal signal mode fiber (i.e., a positive dispersion fiber) or the like is used to stretch the pulses in the time domain, while a negative dispersion fiber or the like is used to compress the pulses in the time domain. The length of the optical fiber, which is the main dispersive element in the system, can be adjusted to achieve the desired time domain spread. Positive or negative dispersion fibers can be used for time domain manipulation device 22. Negative dispersion will result in a waveform that is the time-reversed image of the waveform produced by positive dispersion. For a given sign of dispersion, the time-reversal can also be achieved by reversing the spectrum modulation using the SLM or any other type of optical filter. Additional examples of wavelength dispersive devices include a high dispersion optical fibers, an optical waveguide operated near the cutoff wavelength, and a photonic bandgap device. Essentially any type of optical filter/resonator (such as fiber Bragg grating) or a plurality of such filters, operated near the cutoff wavelength, can be used.

The attenuation of the individual pixels in the SLM 50 is set by adjusting the gray level of that pixel. By knowing the properties of the dispersive medium 22, wavelength dependence of the photodetector, low-pass characteristics of the photodetector and the RF filter, and the non-uniformity in the intensity of the various wavelength channels, the required attenuation in each channel that would mimic the envelope of the desired waveform can be determined. The optical sampling pulses are separated in time domain due to the wavelength dependent group velocity in the dispersion device.

Figure 5:
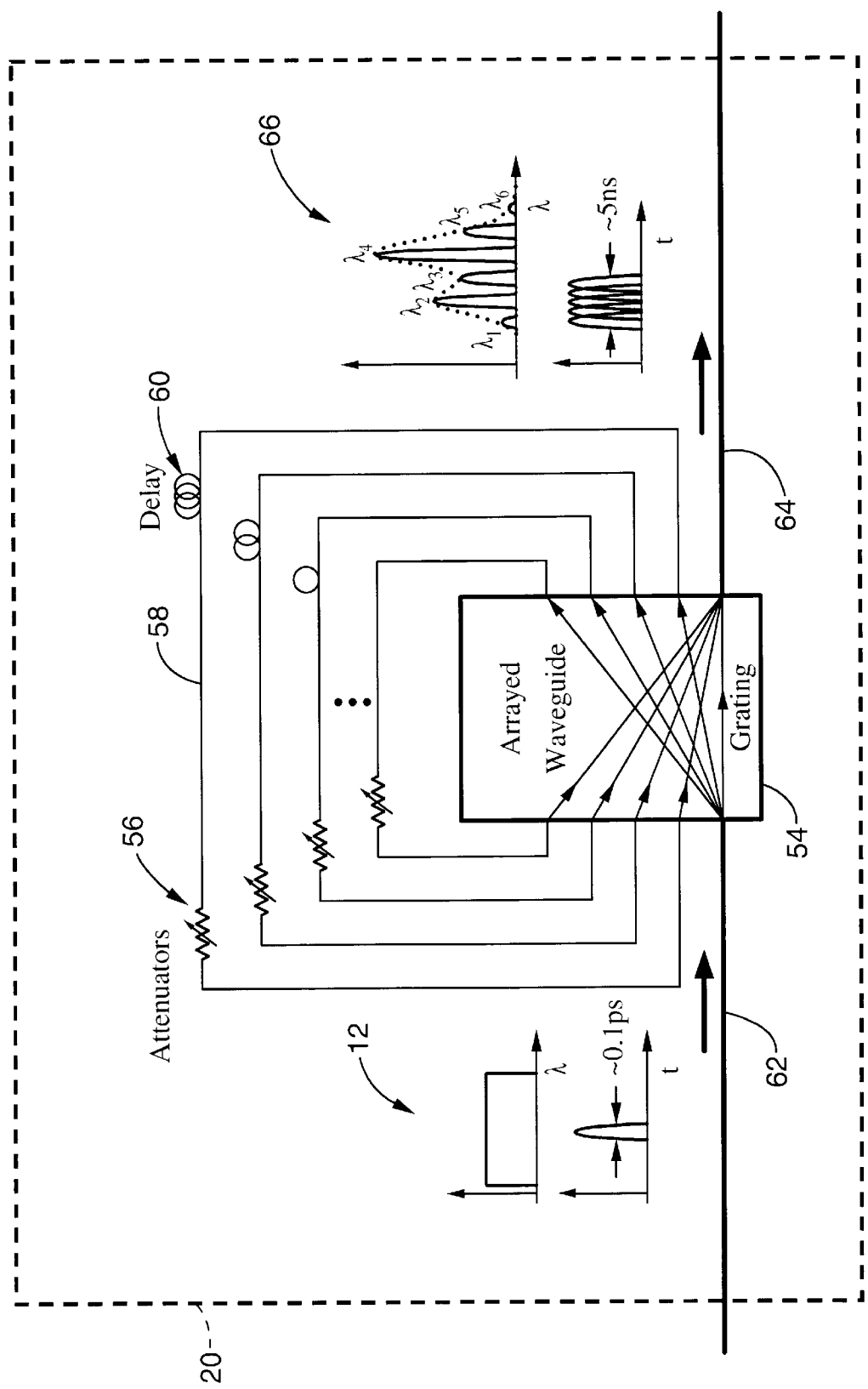
FIG. 5 is a schematic diagram of an embodiment of a spectral shaping device employed in the photonic arbitrary waveform generator of FIG. 1 which uses a true time delay device.

Referring to FIG. 1 and FIG. 5, in an alternative embodiment wavelength division, intensity adjustment of each wavelength channel, and introduction of incremental time delay between wavelength channels is achieved by passing the supercontinuum pulses through a true time delay (TTD) device. In this embodiment, wavelength division is performed by an arrayed waveguide grating 54, and intensity adjustments of wavelength channels is achieved by optical attenuators 56 in each of the delay lines 58. Alternatively, electro-optic modulators could be used instead of optical attenuators. The true time delay device, which is described in more detail in U.S. Pat. No. 5,793,907, incorporated herein by reference, comprises an N input, N output arrayed waveguide grating 54 where all the corresponding inputs and outputs except one set of input-output ports 62, 64 are connected through an incremental time delay 60. For the PAWG of the present invention, optical attenuators 56 are also incorporated into each delay line. The supercontinuum pulse 12 is then fed to the free input port 62. The corresponding output on port 64 comprises a series of optical pulses 66 at different wavelengths set by the arrayed waveguide grating 54 and with set incremental time delay between the pulses. The attenuation for each channel is set in the delay stage to appropriate levels. In the example shown in FIG. 5, the delay between the various wavelength channels is on the order of 5 nanoseconds. The output from the true time delay device can be further stretched, compressed, or inverted, if necessary, using a wavelength dispersive device as described above or a second true time delay device.

Note that the embodiment shown in FIG. 5 can be easily modified to use Electrooptic Mach-Zehnder (MZ) interferometer or electroabsorption modulators in place of attenuators. In this configuration, the waveform can be changed with sub-nanosecond speed.

As can be seen, the output from either embodiment described above is the sampled version of the desired output waveform. This waveform is observed with an electro-optic conversion device 26, preferably comprising either a combination of a high-speed photodetector and an RF low-pass filter, or a low-speed photodetector. The bandwidth $f_c$ of detector stage 26 is determined by the time separation $\Delta\tau$ between the adjacent sampling wavelength channels and is given by $f_c = 1/(2\Delta\tau)$. The resultant waveform is the desired output electrical waveform. Detector stage 26 should have uniform response up to the cut-off frequency, and the response cut-off edge should be as sharp as possible.

Those skilled in the art will appreciate from the foregoing that spectral shaping device 20 is an optical filter, and that other optical filters could be used as well, such as a long period fiber grating, a dielectric multilayer thin film filter, an acousto-optic tunable filter, or the like.

It will be appreciated that the optical supercontinuum source 14 generates pulses over a portion of the optical spectrum with very small variations in intensity. The width of such a flat portion of the spectrum will depend on the number of wavelength channels and the separation between them, which in turn depends on the width of the output waveform in the time-domain and the bandwidth of the detector stage. The overall intensity of the optical source will be stable as a function of time. Note also that the available bandwidth of the PAWG will depend on the bandwidth of the detection circuit; the bandwidth is not limited by dispersion penalty.

With currently available technology, a TTD device with as many as 128 channels can be fabricated, or multiple TTD devices can be used. TTDs are compact since the delay between the wavelength channels is adjusted in the TTD device. On the other hand, in the embodiment shown in FIG. 4 that employs a spatial light modulator, the number of channels available can be larger than 128. Note, however, that delay between the wavelength channels is introduced using long lengths of normal single mode fiber. Hence, the embodiment employing an SLM system is typically not as compact as a system using a TTD device. Further, SLM systems will require a free-space alignment, while a TTD system can be an all fiber-optic system. Other methods for delaying wavelengths with respect to one another include specialty fibers with high dispersion and any type of filter or plurality of filters operated near the resonance. In addition other forms of optical true time delay devices, for example those using fiber Bragg grating can also be used.

Example 1

Experimental Setup and Results for Digital Synthesis

Figure 6:
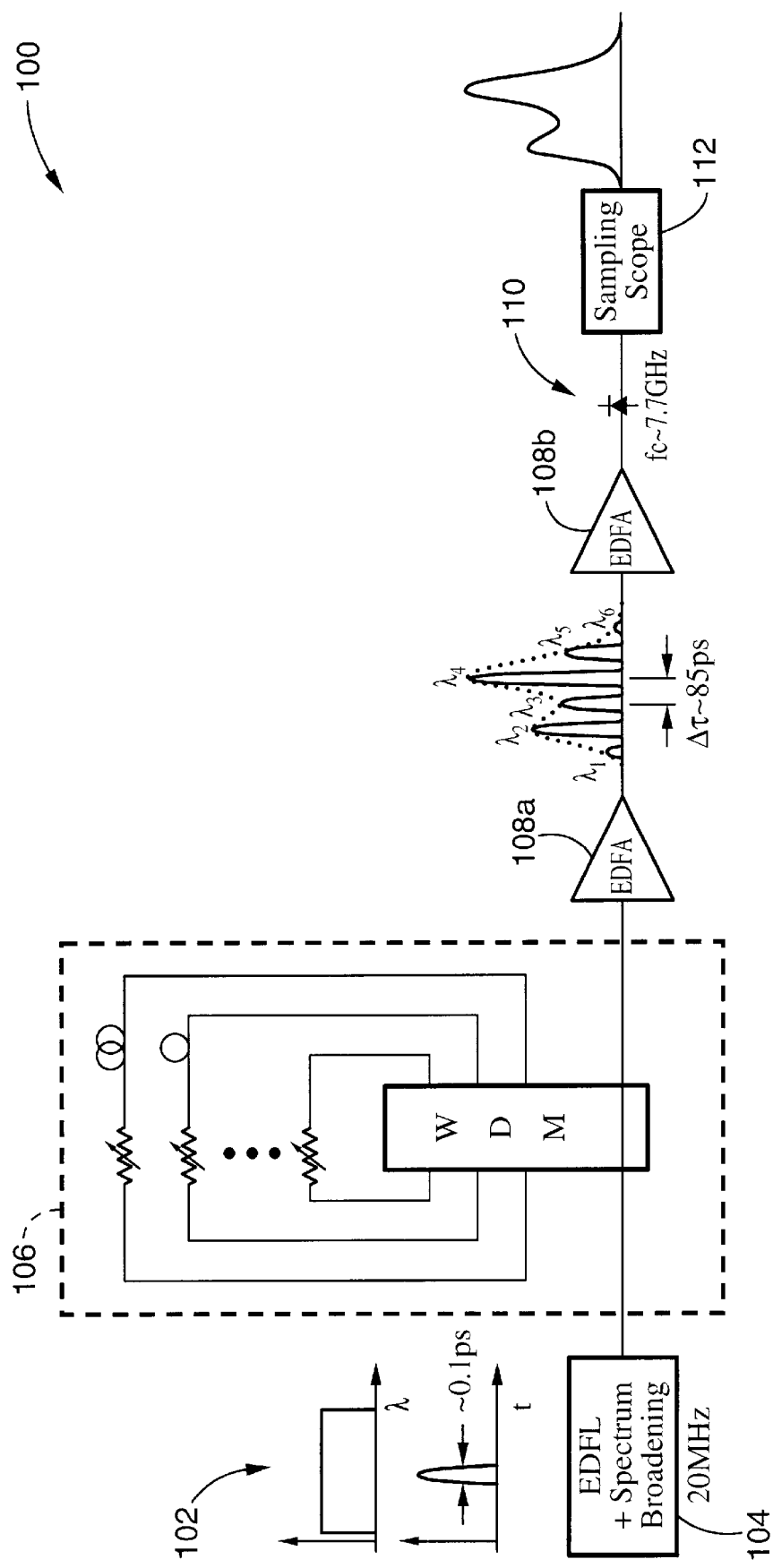
FIG. 6 is a schematic diagram of a test setup employing a photonic arbitrary waveform generator with a true time delay device according to the present invention used for obtaining experimental results.
Figure 7:
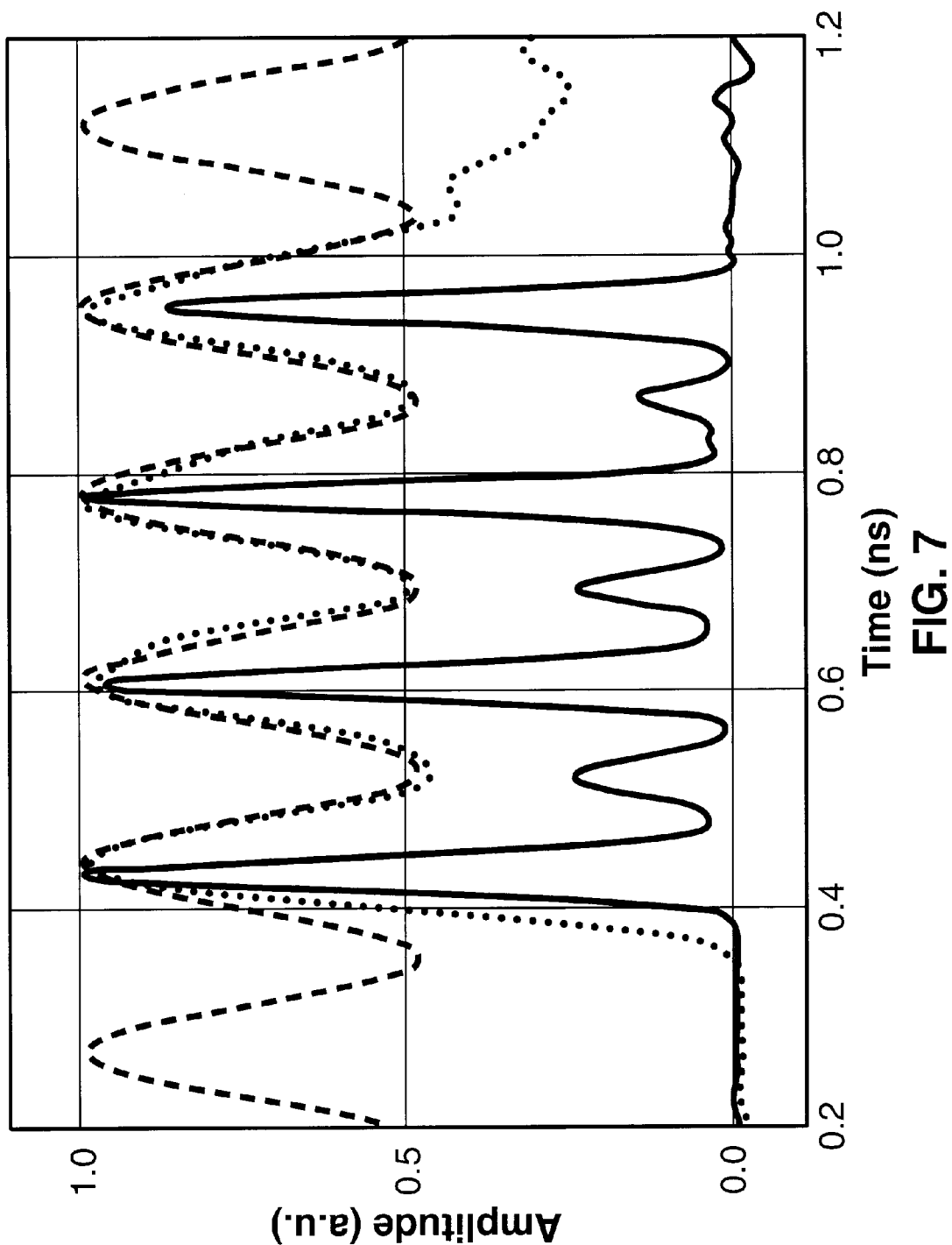
FIG. 7 is a graph showing experimental results from the system of FIG. 6 for the generation of a 5.88 GHz sine wave, where the solid lines correspond to pulses observed with a 60 GHz photodetector, the dotted lines correspond to pulses observed with an under-biased 7.7 GHz photodetector, and the dashed lines correspond to the 5.88 GHz sine wave.
Figure 8:
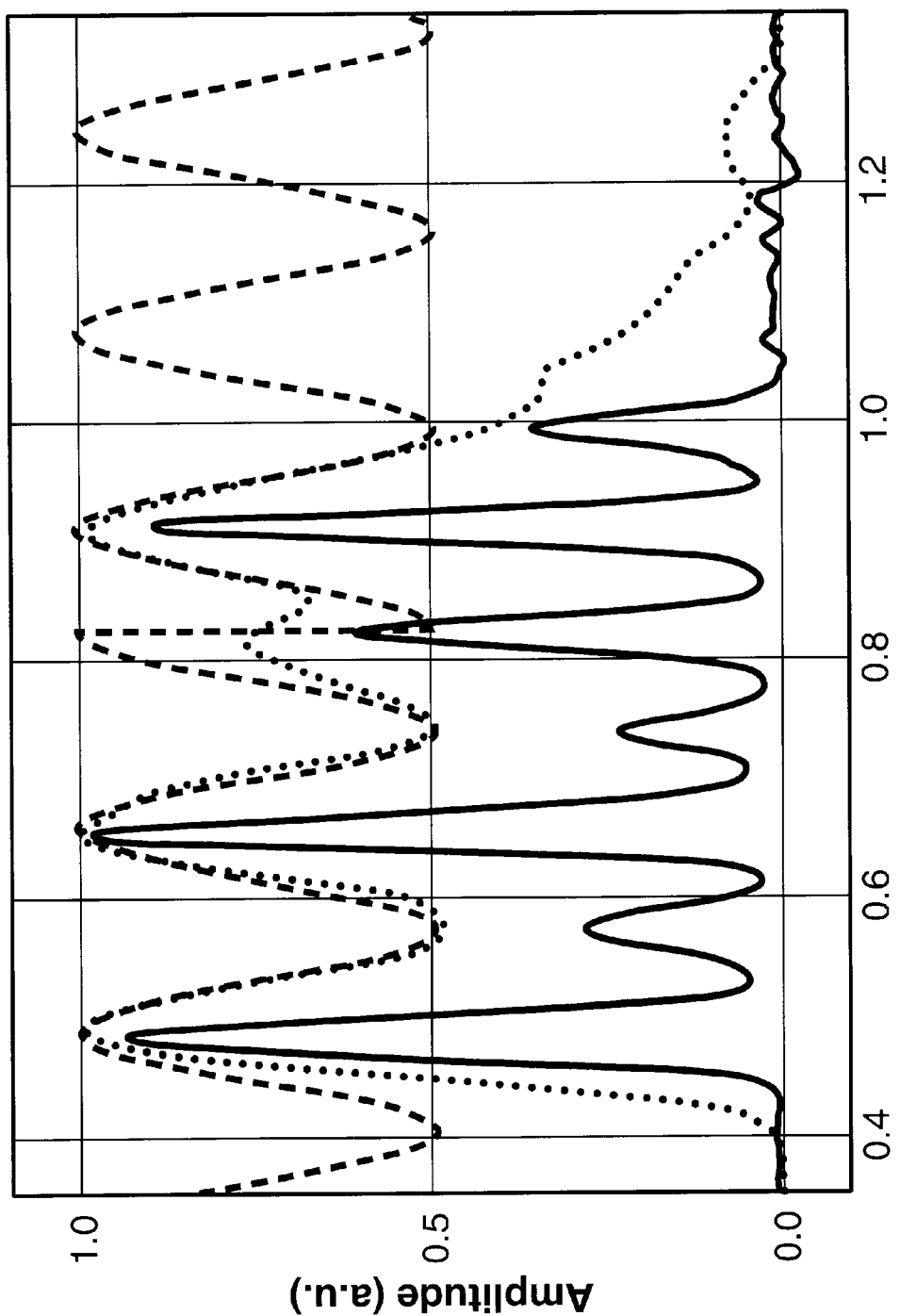
FIG. 8 is a graph showing experimental results from the system of FIG. 6 for the generation of a 5.88 GHz sine wave with a π phase shift in the middle, where the solid lines correspond to pulses observed with a 60 GHz photodetector, the dotted lines correspond to pulses observed with an under-biased 7.7 GHz photodetector, and the dashed lines correspond to the 5.88 GHz sine wave.
Figure 9:
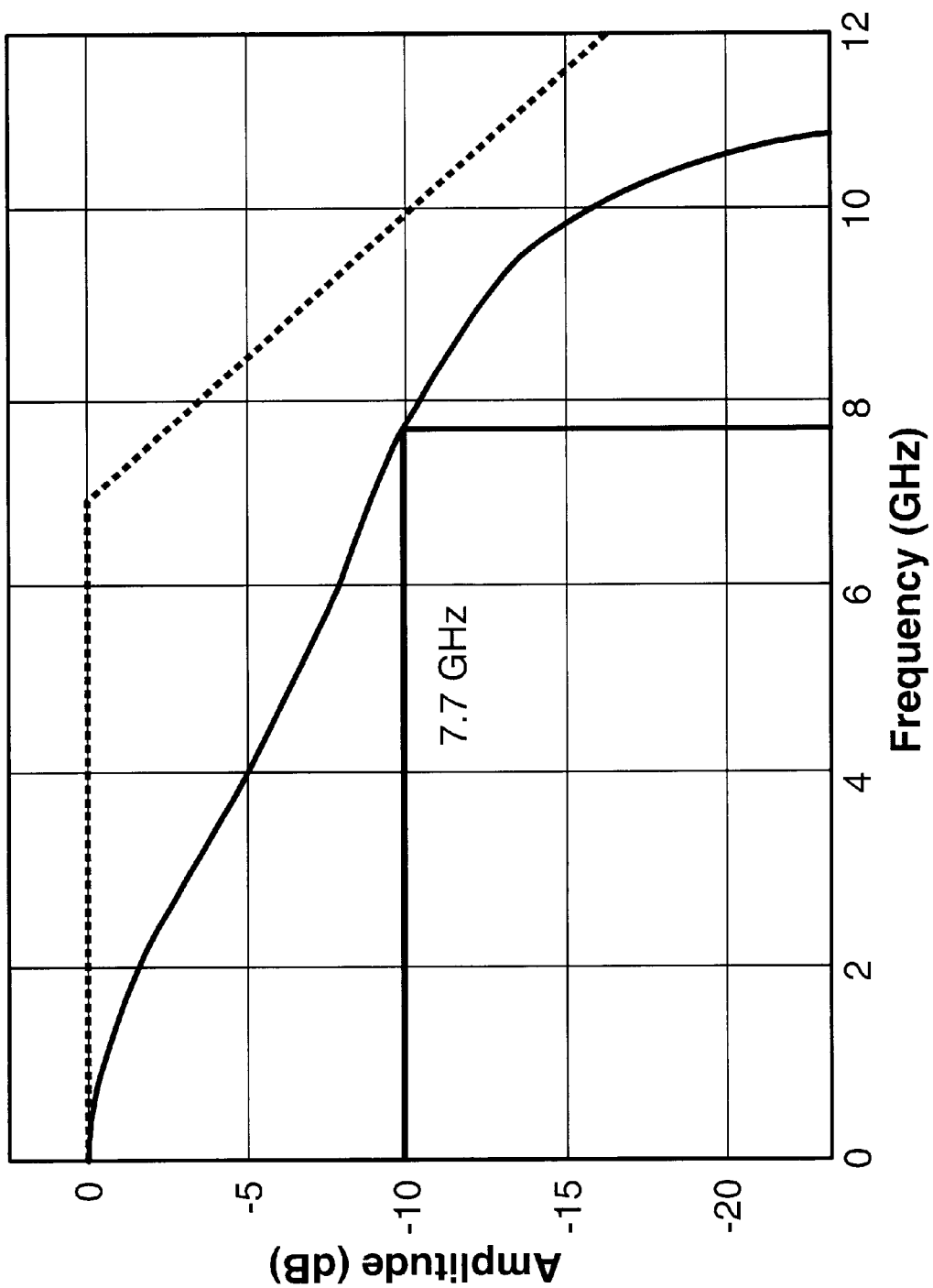
FIG. 9 is a graph showing the low-pass characteristics of the under-biased 7.78 GHz photodetector in FIG. 6 (solid curve) compared with the optimal bias characteristics (dotted line).

Referring now to FIG. 6, an experimental setup 100 is shown. Optical pulses 102, centered at 1558 nm and generated from a Pritel, Inc. passively mode-locked erbium-doped fiber laser (EDFL) 104 using a 20 MHz repetition rate, were passed through a dispersion decreasing fiber to broaden the spectrum while keeping the time domain pulse width within a few picoseconds. The width of the optical spectrum depended on the peak power of the laser and the length of the dispersion-decreasing fiber. A 6 nm broadband optical pulse was obtained and passed through a TTD device 106. The TTD device filtered the optical spectrum into six wavelength channels and delayed each channel by a fixed amount with respect to the previous channel with a shorter wavelength. The width of each channel was 0.3 nm and the channels were separated by 0.8 nm. The sequential delay was adjusted in the TTD device to a desired sampling rate. The increment chosen for $\Delta\tau$ was 85 ps, but other increments can be used as well. The 85 ps increment corresponds to a Nyquist rate of 5.88 GHz. The intensity of each wavelength channel was adjusted to obtain the desired output waveform. The optical pulses were amplified with a Pritel, Inc. erbium-doped fiber amplifiers (EDFA) 108a, 108b, and the time differentiated pulses were then detected with a 7.7 GHz 10 dB bandwidth InGaAs photodetector 110 from Fermionics Opto-Technology and a Tektronics Sampling Scope 112 (CSA 803 with SD32 Sampling Head). The photodetector was under-biased compared to the optimal bias point to limit the frequency response of the photodetector to a lower range. Thus, the photodetector acted as a low-pass filter and could distinguish variations in optical intensity only below the Nyquist rate of the system. Individual sampling pulses were also observed with a Newport high-speed photodetector (D-15 IR detector) operating at 60 GHz. Experimental results are shown in FIG. 7 and FIG. 8 where the solid lines correspond to pulses observed with the 60 GHz photodetector and the dotted lines correspond to pulses observed with the under-biased 7.7 GHz photodetector. The dashed lines in FIG. 7 correspond to a 5.88 GHz sine wave while the dashed lines in FIG. 8 correspond to a 5.88 GHz sine wave with a $\pi$ phase shift in the middle. FIG. 9 shows the low-pass characteristics of the under-biased 7.78 GHz photodetector (solid curve) compared with the optimal bias characteristics (dotted line).

Note that the experimental setup could have alternatively used an SLM configuration rather than a TTD configuration for spectral shaping. Note also that the signal to noise ratio (SNR) is not limited to the noise in the photodetector (e.g., shot noise, thermal noise, dark current noise) when optical amplifiers are used. Noise can also result from amplified spontaneous emission (ASE) in the EDFAs and ASE beat noise in the photodetector. In this regard, it was found that the best SNR could be obtained by using the highest gain in the first EDFA stage in the experimental setup shown in FIG. 6. Noise in the system can also be introduced as laser shot noise, noise in supercontinuum generation and so forth. Conventional filtering and/or calibration techniques can be employed as necessary. For example, the system could be calibrated for operational characteristics such as spectral nonuniformity of the supercontinuum, the low pass filtering characteristics of the detection circuit, wavelength dependent responsivity of the photodetector, and linearity of the detector circuit.

Based on the foregoing, it will be appreciated that the maximum frequency of the PAWG is $1/(N\Delta\tau)$ where N-2 for Nyquist. On the other hand, the minimum frequency is $1/(\text{number of channels} \times \Delta\tau)$. The foregoing experimental results demonstrate that the present invention can generate up to 5.88 GHz waveform segments with a repetition rate of 20 MHz and with or without a $\pi$ phase shift in the middle. Applications of the PAWG of the present invention include, but are not limited to, an ultrafast arbitrary waveform generator, a general purpose digital to analog converter, and a very high speed frequency synthesizer. The PAWG of the present invention can synthesize waveforms at considerably higher frequencies than related devices, such as into the millimeter wave and Tera Hertz range, if photodetectors with sufficient bandwidth are available.

As can be seen, therefore, a photonic arbitrary waveform generator according to the present invention comprises a broadband source, a spectral shaping device, a time domain manipulation device, and an opto-electronic conversion device. Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention for it to be encompassed by the present claims. Furthermore, no element, component, or method step in the present disclosure is Alto intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A photonic arbitrary waveform generator, comprising:
   (a) a broadband optical source; and
   (b) means for converting an optical pulse from said broadband optical source into an electrical waveform, said means comprising means for generating a spectral shaped optical waveform from said optical pulse, means for directly converting said spectral shaped optical waveform into a time domain optical waveform, and means for converting said time domain optical waveform into said electrical waveform;
   wherein said spectral shaped optical waveform and said time domain optical waveform have substantially identical shapes.

2. A photonic arbitrary waveform generator as recited in claim 1, wherein said broadband optical source is selected from the group of laser sources consisting essentially of a mode locked laser, a gain switched semiconductor laser, an externally modulated laser, and two continuous-wave lasers having heterodyned outputs.

3. A photonic arbitrary waveform generator as recited in claim 2, wherein said broadband optical source includes a supercontinuum fiber.

4. A photonic arbitrary waveform generator as recited in claim 3, wherein said supercontinuum fiber is selected from the group of supercontinuum fibers consisting essentially of a single mode fiber, a series of dispersion shifted fibers each with different values of zero dispersion wavelengths, a dispersion decreasing fiber, and a tapered fiber.

5. A photonic arbitrary waveform generator as recited in claim 1, wherein said means for converting an optical pulse from said broadband optical source into an electrical waveform comprises:
   (a) a spectral shaping device;
   (b) a time domain manipulation device; and
   (c) an opto-electronic conversion device.

6. A photonic arbitrary waveform generator as recited in claim 5, wherein said spectral shaping device comprises a spatial light modulator device.

7. A photonic arbitrary waveform generator as recited in claim 6, wherein said spatial light modulator device comprises:
   (a) at least one diffraction grating;
   (b) at least one focusing element; and
   (c) a spatial light modulator.

8. A photonic arbitrary waveform generator as recited in claim 7, wherein said focusing element comprises a lens.

9. A photonic arbitrary waveform generator as recited in claim 5, wherein said spectral shaping device comprises a true time delay device.

10. A photonic arbitrary waveform generator as recited in claim 9, wherein said true time delay device comprises:
    (a) an arrayed waveguide grating having N input ports and N corresponding output ports;
    (b) N−1 incremental time delay lines, wherein N−1 input ports and N−1 corresponding output ports are connected through said incremental time delay lines; and
    (c) an optical attenuator or electro-optic modulator in series with each said time delay line;
    (d) wherein one said input port and corresponding output port are undelayed free ports.

11. A photonic arbitrary waveform generator as recited in claim 5, wherein said spectral shaping device comprises a long period fiber grating.

12. A photonic arbitrary waveform generator as recited in claim 5, wherein said spectral shaping device comprises a dielectric multilayer thin film filter.

13. A photonic arbitrary waveform generator as recited in claim 5, wherein said spectral shaping device comprises an acousto-optic tunable filter.

14. A photonic arbitrary waveform generator as recited in claim 5, wherein said time domain manipulation device comprises a true time delay device.

15. A photonic arbitrary waveform generator as recited in claim 14, wherein said true time delay device comprises:
    (a) an arrayed waveguide grating having N input ports and N corresponding output ports;
    (b) N−1 incremental time delay lines, wherein N−1 input ports and N−1 corresponding output ports are connected through said incremental time delay lines; and
    (c) an optical attenuator or electro-optic modulator in series with each said time delay line;
    (d) wherein one said input port and corresponding output port are undelayed free ports.

16. A photonic arbitrary waveform generator as recited in claim 5, wherein said time domain manipulation device comprises a wavelength dispersive device.

17. A photonic arbitrary waveform generator as recited in claim 16, wherein said wavelength dispersive device comprises an optical fiber.

18. A photonic arbitrary waveform generator as recited in claim 17, wherein said optical fiber comprises a positive dispersion fiber.

19. A photonic arbitrary waveform generator as recited in claim 17, wherein said optical fiber comprises a negative dispersion fiber.

20. A photonic arbitrary waveform generator as recited in claim 17, wherein said optical fiber comprises a high dispersion optical fiber.

21. A photonic arbitrary waveform generator as recited in claim 16, wherein said wavelength dispersive device comprises an optical waveguide operated near the cutoff wavelength.

22. A photonic arbitrary waveform generator as recited in claim 16, wherein said wavelength dispersive device comprises a photonic bandgap device.

23. A photonic arbitrary waveform generator as recited in claim 16, wherein said wavelength dispersive device comprises an optical filter/resonator operated near the cutoff wavelength.

24. A photonic arbitrary waveform generator as recited in claim 5, wherein said opto-electronic conversion device comprises a radio frequency detector.

25. A photonic arbitrary waveform generator as recited in claim 5, wherein said opto-electronic conversion device comprises:
    (a) a high speed photodetector; and
    (b) a radio frequency low pass filter.

26. A photonic arbitrary waveform generator as recited in claim 5, wherein said opto-electronic conversion device comprises a low-speed photodetector.

27. A photonic arbitrary waveform generator, comprising:
(a) a broadband optical source;
(b) a spectral shaping device optically coupled to said optical source and configured to generate a spectrally shaped optical waveform;
(c) a time domain manipulation device optically coupled to said spectral shaping device and configured to generate, by direct wavelength-to-time conversion, a time domain optical waveform from said spectrally shaped optical waveform; and
(d) an opto-electronic conversion device optically coupled to said time domain manipulation device and configured to convert said time domain optical waveform to an electrical waveform;
wherein said spectral shaped optical waveform and said time domain optical waveform have substantially identical shapes.

28. A photonic arbitrary waveform generator as recited in claim 27, wherein said broadband optical source is selected from the group of laser sources consisting essentially of a mode locked laser, a gain switched semiconductor laser, an externally modulated laser, and two continuous-wave lasers having heterodyned outputs.

29. A photonic arbitrary waveform generator as recited in claim 28, wherein said broadband optical source includes a supercontinuum fiber.

30. A photonic arbitrary waveform generator as recited in claim 29, wherein said supercontinuum fiber is selected from the group of supercontinuum fibers consisting essentially of a single mode fiber, a series of dispersion shifted fibers each with different values of zero dispersion wavelengths, a dispersion decreasing fiber, and a tapered fiber.

31. A photonic arbitrary waveform generator as recited in claim 27, wherein said spectral shaping device comprises a spatial light modulator device.

32. A photonic arbitrary waveform generator as recited in claim 31, wherein said spatial light modulator device comprises:
(a) at least one diffraction grating;
(b) at least one focusing element; and
(c) a spatial light modulator.

33. A photonic arbitrary waveform generator as recited in claim 32, wherein said focusing element comprises a lens.

34. A photonic arbitrary waveform generator as recited in claim 27, wherein said spectral shaping device comprises a true time delay device.

35. A photonic arbitrary waveform generator as recited in claim 34, wherein said true time delay device comprises:
(a) an arrayed waveguide grating having N input ports and N corresponding output ports;
(b) N−1 incremental time delay lines, wherein N−1 input ports and N−1 corresponding output ports are connected through said incremental time delay lines; and
(c) an optical attenuator or electro-optic modulator in series with each said time delay line;
(d) wherein one said input port and corresponding output port are undelayed free ports.

36. A photonic arbitrary waveform generator as recited in claim 27, wherein said spectral shaping device comprises a long period fiber grating.

37. A photonic arbitrary waveform generator as recited in claim 27, wherein said spectral shaping device comprises a dielectric multilayer thin film filter.

38. A photonic arbitrary waveform generator as recited in claim 27, wherein said spectral shaping device comprises an acousto-optic tunable filter.

39. A photonic arbitrary waveform generator as recited in claim 27, wherein said opto-electronic conversion device comprises a radio frequency detector.

40. A photonic arbitrary waveform generator as recited in claim 27, wherein said opto-electronic conversion device comprises:
(a) a high speed photodetector; and
(b) a radio frequency low pass filter.

41. A photonic arbitrary waveform generator as recited in claim 27, wherein said opto-electronic conversion device comprises a low-speed photodetector.

42. A photonic arbitrary waveform generator as recited in claim 27, further comprising a time domain manipulation device.

43. A photonic arbitrary waveform generator as recited in claim 42, wherein said time domain manipulation device comprises a true time delay device.

44. A photonic arbitrary waveform generator as recited in claim 43, wherein said true time delay device comprises:
(a) an arrayed waveguide grating having N input ports and N corresponding output ports;
(b) N−1 incremental time delay lines, wherein N−1 input ports and N−1 corresponding output ports are connected through said incremental time delay lines; and
(c) an optical attenuator or electro-optic modulator in series with each said time delay line;
(d) wherein one said input port and corresponding output port are undelayed free ports.

45. A photonic arbitrary waveform generator as recited in claim 42, wherein said time domain manipulation device comprises a wavelength dispersive device.

46. A photonic arbitrary waveform generator as recited in claim 45, wherein said wavelength dispersive device comprises an optical fiber.

47. A photonic arbitrary waveform generator as recited in claim 46, wherein said optical fiber comprises a positive dispersion fiber.

48. A photonic arbitrary waveform generator as recited in claim 46, wherein said optical fiber comprises a negative dispersion fiber.

49. A photonic arbitrary waveform generator as recited in claim 46, wherein said optical fiber comprises a high dispersion optical fiber.

50. A photonic arbitrary waveform generator as recited in claim 45, wherein said wavelength dispersive device comprises an optical waveguide operated near the cutoff wavelength.

51. A photonic arbitrary waveform generator as recited in claim 45, wherein said wavelength dispersive device comprises a photonic bandgap device.

52. A photonic arbitrary waveform generator as recited in claim 45, wherein said wavelength dispersive device comprises an optical filter/resonator operated near the cutoff wavelength.

53. A photonic arbitrary waveform generator, comprising:
(a) a broadband optical source;
(b) a spectral shaping device optically coupled to said optical source and configured for converting a pulse from said optical source to a shaped and wavelength divided output optical waveform;
(c) a time domain manipulation device optically coupled to said spectral shaping device and configured to directly convert the output of the said spectral shaping device into a time domain optical waveform; and
(d) an opto-electronic conversion device optically coupled to said time domain manipulation device and configured for converting said optical waveform from said time domain manipulation device to a corresponding electrical waveform;

wherein said spectral shaped waveform and said time domain waveform have substantially identical shapes.

54. A photonic arbitrary waveform generator as recited in claim 53, wherein said broadband optical source is selected from the group of laser sources consisting essentially of a mode locked laser, a gain switched semiconductor laser, an externally modulated laser, and two continuous-wave lasers having heterodyned outputs.

55. A photonic arbitrary waveform generator as recited in claim 54, wherein said broadband optical source includes a supercontinuum fiber.

56. A photonic arbitrary waveform generator as recited in claim 55, wherein said supercontinuum fiber is selected from the group of supercontinuum fibers consisting essentially of a single mode fiber, a series of dispersion shifted fibers each with different values of zero dispersion wavelengths, a dispersion decreasing fiber, and a tapered fiber.

57. A photonic arbitrary waveform generator as recited in claim 53, wherein said spectral shaping device comprises a spatial light modulator device.

58. A photonic arbitrary waveform generator as recited in claim 57, wherein said spatial light modulator device comprises:

(a) at least one diffraction grating;
(b) at least one focusing element; and
(c) a spatial light modulator.

59. A photonic arbitrary waveform generator as recited in claim 58, wherein said focusing element comprises a lens.

60. A photonic arbitrary waveform generator as recited in claim 53, wherein said spectral shaping device comprises a true time delay device.

61. A photonic arbitrary waveform generator as recited in claim 60, wherein said true time delay device comprises:

(a) an arrayed waveguide grating having N input ports and N corresponding output ports;
(b) N−1 incremental time delay lines, wherein N−1 input ports and N−1 corresponding output ports are connected through said incremental time delay lines; and
(c) an optical attenuator or electro-optic modulator in series with each said time delay line;
(d) wherein one said input port and corresponding output port are undelayed free ports.

62. A photonic arbitrary waveform generator as recited in claim 53, wherein said spectral shaping device comprises a long period fiber grating.

63. A photonic arbitrary waveform generator as recited in claim 53, wherein said spectral shaping device comprises a dielectric multilayer thin film filter.

64. A photonic arbitrary waveform generator as recited in claim 53, wherein said spectral shaping device comprises an acousto-optic tunable filter.

65. A photonic arbitrary waveform generator as recited in claim 53, wherein said opto-electronic conversion device comprises a radio frequency detector.

66. A photonic arbitrary waveform generator as recited in claim 53, wherein said opto-electronic conversion device comprises:

(a) a high speed photodetector; and
(b) a radio frequency low pass filter.

67. A photonic arbitrary waveform generator as recited in claim 53, wherein said opto-electronic conversion device comprises a low-speed photodetector.

68. A photonic arbitrary waveform generator as recited in claim 53, further comprising a time domain manipulation device coupled to said spectral shaping device and configured for stretching, compressing, or inverting said optical waveform in the time domain.

69. A photonic arbitrary waveform generator as recited in claim 68, wherein said time domain manipulation device comprises a true time delay device.

70. A photonic arbitrary waveform generator as recited in claim 69, wherein said true time delay device comprises:

(a) an arrayed waveguide grating having N input ports and N corresponding output ports;
(b) N−1 incremental time delay lines, wherein N−1 input ports and N−1 corresponding output ports are connected through said incremental time delay lines; and
(c) an optical attenuator or electro-optic modulator in series with each said time delay line;
(d) wherein one said input port and corresponding output port are undelayed free ports.

71. A photonic arbitrary waveform generator as recited in claim 68, wherein said time domain manipulation device comprises a wavelength dispersive device.

72. A photonic arbitrary waveform generator as recited in claim 71, wherein said wavelength dispersive device comprises an optical fiber.

73. A photonic arbitrary waveform generator as recited in claim 72, wherein said optical fiber comprises a positive dispersion fiber.

74. A photonic arbitrary waveform generator as recited in claim 72, wherein said optical fiber comprises a negative dispersion fiber.

75. A photonic arbitrary waveform generator as recited in claim 73, wherein said optical fiber comprises a high dispersion optical fiber.

76. A photonic arbitrary waveform generator as recited in claim 71, wherein said wavelength dispersive device comprises an optical waveguide operated near the cutoff wavelength.

77. A photonic arbitrary waveform generator as recited in claim 71, wherein said wavelength dispersive device comprises a photonic bandgap device.

78. A photonic arbitrary waveform generator as recited in claim 71, wherein said wavelength dispersive device comprises an optical filter/resonator operated near the cutoff wavelength.

79. A method for photonic arbitrary waveform generation, comprising:

(a) generating an optical pulse from a broadband optical source;
(b) dividing said optical pulse into a plurality of wavelength channels;
(c) spectrally shaping said wavelength channels according to a desired waveform envelope and generating a spectral shaped optical waveform;
(d) directly converting said spectrally shaped optical waveform into a time domain optical waveform; and
(e) generating a corresponding electrical waveform from said time domain optical waveform;
wherein said spectral shaped waveform and said time domain waveform have substantially identical shapes.

80. A method as recited in claim 79, wherein said broadband optical source is selected from the group of laser sources consisting essentially of a mode locked laser, a gain switched semiconductor laser, an externally modulated laser, and two continuous-wave lasers having heterodyned outputs.

81. A method as recited in claim 80, wherein said broadband optical source includes a supercontinuum fiber.

82. A method as recited in claim 81, wherein said supercontinuum fiber is selected from the group of supercontinuum fibers consisting essentially of a single mode fiber, a series of dispersion shifted fibers each with different values of zero dispersion wavelengths, a dispersion decreasing fiber, and a tapered fiber.

83. A method as recited in claim 79, wherein said optical pulse is divided into a plurality of wavelength channels, said wavelength channels are spectrally shaped according to a desired waveform envelope, and said shaped optical waveform is generated using a spatial light modulator device.

84. A method as recited in claim 83, wherein said spatial light modulator device comprises:
    (a) at least one diffraction grating;
    (b) at least one focusing element; and
    (c) a spatial light modulator.

85. A method as recited in claim 84, wherein said focusing element comprises a lens.

86. A method as recited in claim 79, wherein said optical pulse is divided into a plurality of wavelength channels, said wavelength channels are spectrally shaped according to a desired waveform envelope, and said shaped optical waveform is generated using a true time delay device.

87. A method as recited in claim 86, wherein said true time delay device comprises:
    (a) an arrayed waveguide grating having N input ports and N corresponding output ports;
    (b) N−1 incremental time delay lines, wherein N−1 input ports and N−1 corresponding output ports are connected through said incremental time delay lines; and
    (c) an optical attenuator or electro-optic modulator in series with each said time delay line;
    (d) wherein one said input port and corresponding output port are undelayed free ports.

88. A method as recited in claim 79, wherein said optical pulse is divided into a plurality of wavelength channels, said wavelength channels are spectrally shaped according to a desired waveform envelope, and said shaped optical waveform is generated using a long period fiber grating.

89. A method as recited in claim 79, wherein said optical pulse is divided into a plurality of wavelength channels, said wavelength channels are spectrally shaped according to a desired waveform envelope, and said shaped optical waveform is generated using a dielectric multilayer thin film filter.

90. A method as recited in claim 79, wherein said optical pulse is divided into a plurality of wavelength channels, said wavelength channels are spectrally shaped according to a desired waveform envelope, and said shaped optical waveform is generated using an acousto-optic tunable filter.

91. A method as recited in claim 79, wherein said electrical waveform is generated from said shaped optical waveform using an opto-electronic conversion device.

92. A method as recited in claim 91, wherein said opto-electronic conversion device comprises a radio frequency detector.

93. A method as recited in claim 91, wherein said opto-electronic conversion device comprises:
    (a) a high speed photodetector; and
    (b) a radio frequency low pass filter.

94. A method as recited in claim 91, wherein said opto-electronic conversion device comprises a low-speed photodetector.

95. A method as recited in claim 79, further comprising manipulating said shaped optical waveform in the time domain.

96. A method as recited in claim 95, wherein said shaped optical waveform is manipulated in the time domain using a true time delay device.

97. A method as recited in claim 96, wherein said true time delay device comprises:
    (a) an arrayed waveguide grating having N input ports and N corresponding output ports;
    (b) N−1 incremental time delay lines, wherein N−1 input ports and N−1 corresponding output ports are connected through said incremental time delay lines; and
    (c) an optical attenuator or electro-optic modulator in series with each said time delay line;
    (d) wherein one said input port and corresponding output port are undelayed free ports.

98. A method as recited in claim 95, wherein said shaped optical waveform is manipulated in the time domain using a wavelength dispersive device.

99. A method as recited in claim 98, wherein said wavelength dispersive device comprises an optical fiber.

100. A method as recited in claim 99, wherein said optical fiber comprises a positive dispersion fiber.

101. A method as recited in claim 99, wherein said optical fiber comprises a negative dispersion fiber.

102. A method as recited in claim 99, wherein said optical fiber comprises a high dispersion optical fiber.

103. A method as recited in claim 98, wherein said wavelength dispersive device comprises an optical waveguide operated near the cutoff wavelength.

104. A method as recited in claim 98, wherein said wavelength dispersive device comprises a photonic bandgap device.

105. A method as recited in claim 98, wherein said wavelength dispersive device comprises an optical filter/resonator operated near the cutoff wavelength.

106. A method for photonic arbitrary waveform generation, comprising:

generating an optical signal from a broadband optical source, said optical signal comprising one or more optical pulses;

spectrally shaping said optical signal;

directly converting said spectrally shaped signal into a time domain optical signal; and converting said time domain optical signal to an electrical signal;

wherein said spectral shaped optical signal and said time domain optical signal have substantially identical waveform shapes.

107. An apparatus for photonic arbitrary waveform generation, comprising:

means for generating an optical signal from a broadband optical source, said optical signal comprising one or more optical pulses;

means for spectrally shaping said optical signal;

means for directly converting said spectrally shaped signal into a time domain optical signal; and means for converting said time domain optical signal to an electrical signal;

wherein said spectral shaped optical signal and said time domain optical signal have substantially identical waveform shapes.

108. A method for photonic arbitrary waveform generation, comprising:

generating an optical signal from a broadband optical source, said optical signal comprising one or more optical pulses, said optical signal having an unshaped spectrum;

mapping the unshaped spectrum to the time domain;

shaping the spectrum of said optical signal; and converting said optical signal to an electrical signal;

wherein the spectral and time domain waveforms have substantially identical shapes.

109. An apparatus for photonic arbitrary waveform generation, comprising:

means for generating an optical signal from a broadband optical source, said optical signal comprising one or more optical pulses, said optical signal having an unshaped spectrum;

means for mapping the unshaped spectrum to the time domain;

means for shaping the spectrum of said optical signal; and means for converting said optical signal to an electrical signal;

wherein the spectral and time domain waveforms have substantially identical shapes.

* * * * *